Dec. 2, 1969 A. W. MILLER 3,482,071

HIGH REPEATABILITY SWITCH

Filed Aug. 3, 1967

2 Sheets-Sheet 1

INVENTOR.

ARNOLD W. MILLER

BY Lieber & Nilles

ATTORNEY

Dec. 2, 1969 A. W. MILLER 3,482,071

HIGH REPEATABILITY SWITCH

Filed Aug. 3, 1967 2 Sheets-Sheet 2

INVENTOR.

ARNOLD W. MILLER

BY Lieber & Miller

ATTORNEY

United States Patent Office 3,482,071
Patented Dec. 2, 1969

3,482,071
HIGH REPEATABILITY SWITCH

Arnold W. Miller, 14800 W. Grange Ave., New Berlin, Wis. 53151

Filed Aug. 3, 1967, Ser. No. 658,262
Int. Cl. H01h 29/00, 3/00, 1/14
U.S. Cl. 200—152 16 Claims

ABSTRACT OF THE DISCLOSURE

A switching element includes a first member having a pair of spaced, mercury wetted surfaces, each of the surfaces being connected to a switch terminal. A second member is movable toward and away from said first member, preferable within a housing, and includes a mercury wetted shorting surface adapted to connect the spaced surfaces when the second member is moved toward and into abutment with said first member.

BACKGROUND OF THE INVENTION

Field of the invention

The present invention relates to electrical switching means and more particularly to switching means having a high degree of repeatability.

Description of the prior art

The use of switching means in electrical circuitry for interrupting or directing the flow of electrical current is elementary. Such switching means are designed to have an open position, in which the infinite impedance between the terminals thereof stops the flow of electrical current, and a closed position, in which the impedance between the terminals of the switching element is substantially lower so that electrical current may pass between the terminals. It is generally desirable to have the resistance of the switching means in the closed position as low as possible so as to reduce electrical losses to a minimum.

In certain switching means applications, it is important that the resistance of the means in the closed position remain constant throughout a plurality of serially conducted switching operations. This criteria of switch performance is termed "repeatability" and is determined by recording the resistance of the switching means in the closed position during each of a plurality of switching operations and obtaining the maximum difference between the highest and the lowest recorded resistances. As used herein, a high degree of repeatability, or a high repeatability factor, is indicative of a low variation in resistance. By way of example, in a dry contact type of switch, the maximum repeatability presently obtainable is on the order of 100 micro-ohms.

The repeatability of a switching means becomes extremely critical when such elements are employed in instruments providing precise measurement of electrical quantities or electrical calibration to other devices. Typical of such instruments are the well-known Wheatstone bridge or Mueller bridge. Switching means are employed in these bridge circuits to vary the resistance of the circuit by switching a plurality of precision resistors in and out of the circuit. As may be readily understood, an appreciable variation in the resistance of the switching element from one switching operation to the next, due to a low repeatability factor, is sufficient to reduce the accuracy of the instrument by a significant amount.

In an effort to provide the necessary degree of repeatability to switching means, it has become common practice to wet or coat the contacts of the switch with a liquid, current carrying agent, such as mercury, so that when the switch is closed, the mercury assists in making a more perfect connection between the contacts. Mercury wetted contact switches have been designed with repeatability factors approaching 10 micro-ohms.

Presently available mercury wetted contact switches possess features which make their operation and maintenance troublesome and their repeatability factor subject to a lessening over a period of time. In the main, this has been due to the necessity of moving or transporting one or more mercury coated contacts to various positions in the switch in performance of the switching function. Inevitably, small portions of the mercury drop off the moving contacts, causing electrical shorts in the switch, and requiring periodic cleaning of the switch and replacement of the mercury. Furthrer, unless shielded from the atmosphere by inert gas, a vacuum, or oil, the mercury on the contacts is exposed to the air and subject to slow oxidation which alters the repeatability factor of the switch and also requires periodic replacement of the mercury.

SUMMARY OF THE PRESENT INVENTION

It is, therefore the object of the present invention to provide an improved switch of the mercury wetted contact type, having an increased repeatability factor. Particularly, the present invention provides an improved switch of the mercury wetted contact type in which the mercury is not transported between switching contacts in the switch and in which the oxidation of the mercury is held to a minimum.

The present invention provides a switching element providing a breakable connection between a pair of terminals. The switching element is comprised of a first member having a pair of spaced mercury wetted surfaces connected to the terminals of the switching element. The switching element also includes a second member movable toward and away from the first member within a housing. The second member includes a mercury wetted shorting surface adapted to connect the spaced surfaces when the second member is moved toward and into abutment with the first member. Both the first member and the second member may be enclosed in a housing or other retaining means so that the second member moves toward and away from the first member within the housing. The housing serves to prevent the spillage or loss of mercury prevalent in prior art switching elements of this type and to lessen the oxidation of the mercury.

A plurality of switching elements, as described above, may be positioned on a common support to form a switching means. A selector means is operatively associated with the plurality of switching elements to selectively move the second members of the switching elements toward the first members.

BRIEF DESCRIPTION OF THE DRAWINGS

FIGURE 3 being taken along the line 3—3 of FIGURE 2 and showing switching elements in both the open and closed positions.

DESCRIPTION OF THE PREFERRED EMBODIMENT

Figures 1, 2, 3, 4:
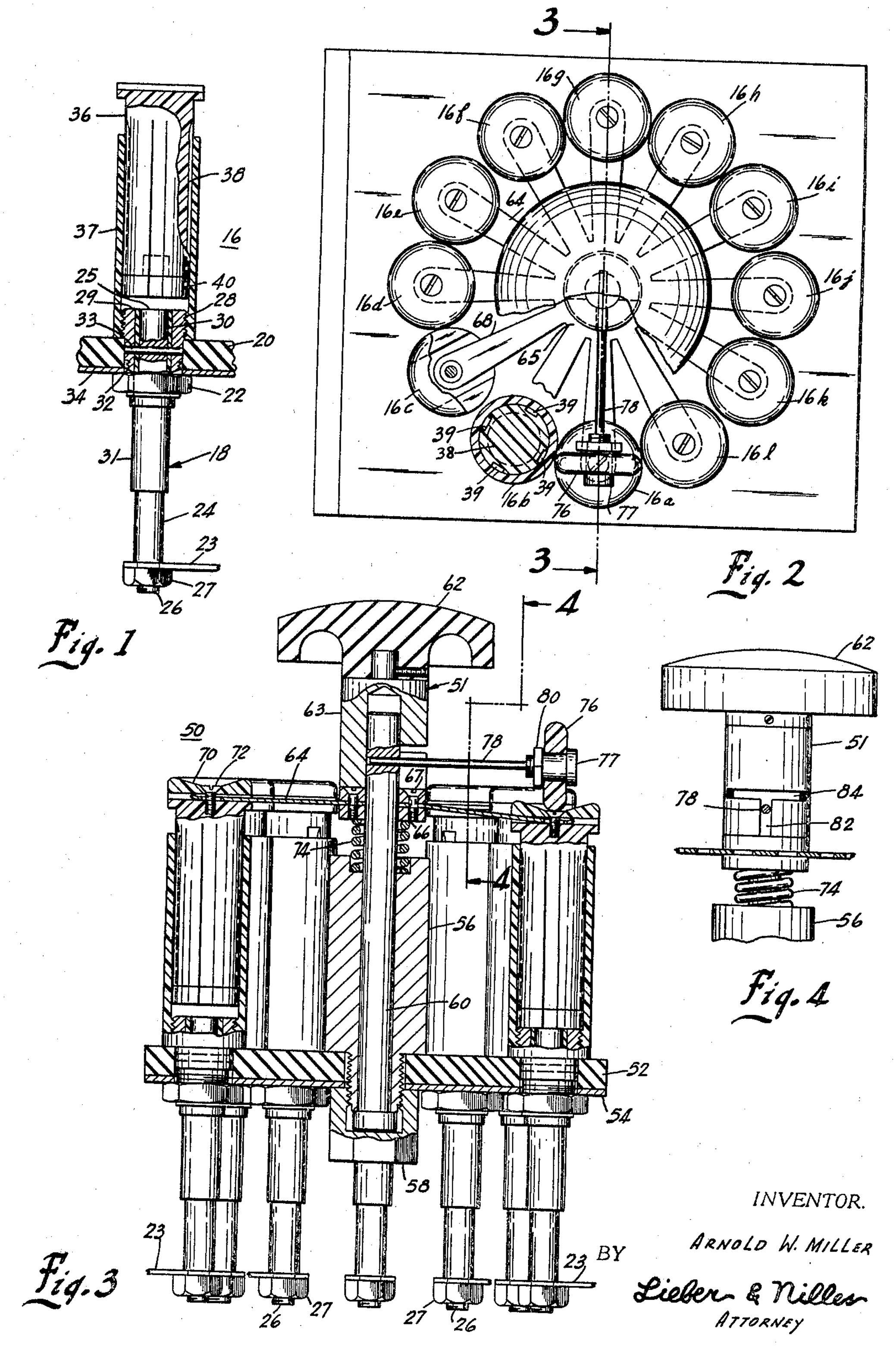
FIGURE 1 is a partially cross sectional view of a switching element constructed in accordance with the present invention.
FIGURE 2 is a plan view of the switching means, incorporating the switching element of FIGURE 1, portions of FIGURE 2 being in cross section.
FIGURE 3 is a cross sectional view of the switching means of FIGURE 2 in elevation.
FIGURE 4 is a perspective view of a portion of the switching means of FIGURES 2 and 3 taken along the line 4—4 of FIGURE 3.

Referring now to FIGURE 1, there is shown therein a switching element 16 constructed in accordance with the present invention. Switching element 16 includes a first member comprised of a pair of spaced conductors. Specifically, first member 18 includes a rod like central conductor 24 containing threads 26 at one end thereof which form one terminal of switching element 16. Bus 23 may be connected to the terminal thus formed by nut 27. The electrical connection between bus 23 and central conductor 24 may be aided by welding, soldering or the use of mercury along abutting surfaces. Central conductor 24 may be constructed from an easily machined electrical conductor, such as brass or copper. The other end of the central conductor 24 forms a flattened surface 25.

First member 18 also includes an outer peripheral conductor 28 which coaxially surrounds central conductor 24 and is separated from central conductor 24 by annular insulator 30. Outer conductor 28 is also constructed from brass or copper. The surface of outer conductor 28 contains threads 32 for nut 22 which, in addition to retaining switching element 16 in insulating support 20, connects outer conductor 28 to bus 34, thus forming the second terminal of switching element 16. The electrical connection between bus 34 and outer conductor 28 may be aided by welding, soldering or the use of mercury along abutting surfaces. Bus 34 may be mounted on the lower surface of support 20. The other end of outer conductor 28 also forms a flattened surface 29.

Insulator 30 is preferably formed of a hard insulating material of high resistivity, such as epoxy or polyester resin, or the like, which may be poured between central conductor 24 and outer conductor 28 in the liquid form and allowed to harden. Exposed surface of insulator 30 is flat so that the flattened surfaces 25 and 29 and insulator 30, are flush or coplanar. The aforementioned hard insulating material has been found to be most desirable in preventing contamination of the insulator, which could lead to an electrical breakdown of the insulator and the formation of a high resistance electrical path between central conductor 24 and outer conductor 28. An insulated pin 33, constructed from Bakelite or the like serves to hold central conductor 24 and outer conductor 28 together against the forces generated by the tightening of nuts 22 or 27, also preventing a breakdown of insulator 30.

Insulator 30 extends along central conductor 24 so as to prevent accidental shorts between central conductor 24 and outer conductor 28. If desired, the portion of insulator 30 extending along central conductor 24 may comprise a tetrafluoroethylene sleeve 31 mounted below the epoxy resin.

A second member 36 is positioned axially above first member 18. Such positioning is aided by a sleeve or tube 37 which may be threaded, or otherwise affixed, to the outer surface of the upper portion of outer conductor 28. Second member 36 is movable toward and away from first member 18 within tube 37. Second member 36 is comprised of a piston-like plunger 38 which terminates in a brass or copper disc 40. Disc 40 and plunger 38 contain a plurality of slots 39 along the periphery thereof which serve as air vents. See FIGURE 2 which shows a horizontal cross section of plunger 38. The lower surface of disc 40 is formed so as to be parallel to the flattened exposed surfaces 25 and 29 of central conductor 24 and outer conductor 28. Plunger 38 and tube 37 may be fitted so as to maintain the parallelism of the aforementioned surfaces, thereby aiding in the attainment of the high repeatability factor of the switch.

Both the lower surface of disc 40 and the flattened exposed surfaces 25 and 29 of central conductor 24 and outer conductor 28 are coated or wetted with mercury so as to improve the electrical connection of central conductor 24 to outer conductor 28 through disc 40. It is considered presently preferable to form a mercury amalgam of the grass or copper from which the conductors and disc are constructed, along the surfaces of the conductors and the disc. Such an amalgam may be obtained by initially applying mercuous nitrate to the surfaces. After the mercuous nitrate has formed the mercury-brass amalgam, the surfaces are cleaned with a solvent, such as carbon tetrachloride or chlorathene and triple distilled mercury applied to the contacts. The cohesion of the mercury to the amalgam along the exposed surfaces of central conductor 24, outer conductor 28 and disc 40, is sufficient to retain it on the surfaces and prevent a shorting of central conductor 24 to outer conductor 28 except cases where an excessive amount of mercury is placed on the conductors.

When the mercury wetted lower surface or disc 40 is moved into abutment with the mercury wetted contacts formed by the exposed surfaces of central conductor 24 and outer conductor 28, a low resistance connection is made between the two conductors. Slots 39 and disc 40 and plunger 38 prevent the entrapment of air in tube 37 between second member 36 and first member 18 which might interfere with the abutment of the lower surface of disc 40 against the exposed surfaces of central conductor 24 and outer conductor 28.

It will be appreciated that the opening and closing of the switching element takes place within tube 37 so that the loss of mercury prevalent in the prior art type of mercury wetted switches is avoided and the repeatability factor of a switching element increased. Further, tube 37 lessens the rate of oxidation of the mercury, particularly when switching element 16 is left in the closed position when not in use. Tubes 37 may be filled with oil to lessen the oxidation of the mercury.

Switch element 16 finds its greatest utility in a switching means or switch employing a plurality of switching elements. Such a switching means 50 is shown in FIGURES 2 through 5. In a typical embodiment of switching means 50, a plurality of switching elements **16*a* through 16*k*, arranged in a circular pattern, are mounted on a common mounting board 52. A selector means 51 is mounted in the center of the circular pattern of switching element 16. Bus 54, mounted on the lower surface of support 52 is connected to the outer conductor 28 of switching elements 16. If desired, bus 54 may be a common bus connected to all switching elements 16. A bus 25 connected to the terminal at the end of each of central conductors 24 of switching elements 16*a* through 16*k*, as by nuts 27, so that by the selective operation of one of the switching elements, the bus 25 connected to central conductor 24 of that switching element is connected to bus 54**.

Selector means 51 includes a central collar 56 mounted in board 52, as by nut 58. Collar 56 contains a shaft 60 rotatably journalled therein. Shaft 60 is rotated by knob 62, in a manner hereinafter described.

Selector means 51 is connected to switching elements 16 by a spoke-like spider 64, best seen in FIGURE 2. Spider 64 contains a hub 65 fastened to collar 66 on shaft 60, as by screws 67. Each of the spokes 68 of spider 64 is fastened to the top of one of the plungers 38 on switching elements **16*a* through 16k, as by grooved cap 70 and screws 72 extending through the caps and spokes and threaded in plungers 38. The upper surface of cap 70** may contain a circular depression.

Plungers 38 are held in the raised position, so that switching elements **16*a* through 16*k* are open, by spring 74 which surrounds shaft 60 and exerts an upward force on collar 66 and spider 64**.

Plungers 38 are moved downward so that discs 40 abut the exposed surfaces of central conductors 24 and outer conductors 28 by means of roller 76. Roller 76 is journalled in hub 77 on the exposed end of shaft 78 and retained on the hub by nut 80. The other end of shaft 78 extends through slot 82 and depending hub 63 of knob 62 into shaft 60. The length of shaft 78 is such as to position roller 76 over the center of caps 70 of plungers 38 as shown in plan in FIGURE 2 and cross section in FIGURE 3. The axial location of shaft 78 and roller 76 along shaft 60 is such that when roller 76 is positioned over a particular plunger 38, that plunger is depressed against the upward force of spring 74 and the respective spoke 68 so as to move mercury wetted disc 40 into abutment with central conductor 24 and outer conductor 28. The positioning of roller 76 is controlled by hub 63 of knob 62. The configuration of hub 63 is shown most clearly in FIGURE 4. Slot 82 containing shaft 78 is an elongated vertical slot extending axially along the periphery of hub 63 and terminating in an horizontal arcuate slot 84. With knob 62 in the position shown in FIGURES 3 and 4, when knob 62 is rotated, roller 76 is swung in an arcuate path across the tops of caps 70 by the force exerted on shaft 78 by slot 82. Roller 76 may be positioned over and desired switching element to close that switching element as shown in FIGURE 3.

Figures 5, 6, 7, 8, 9, 10:
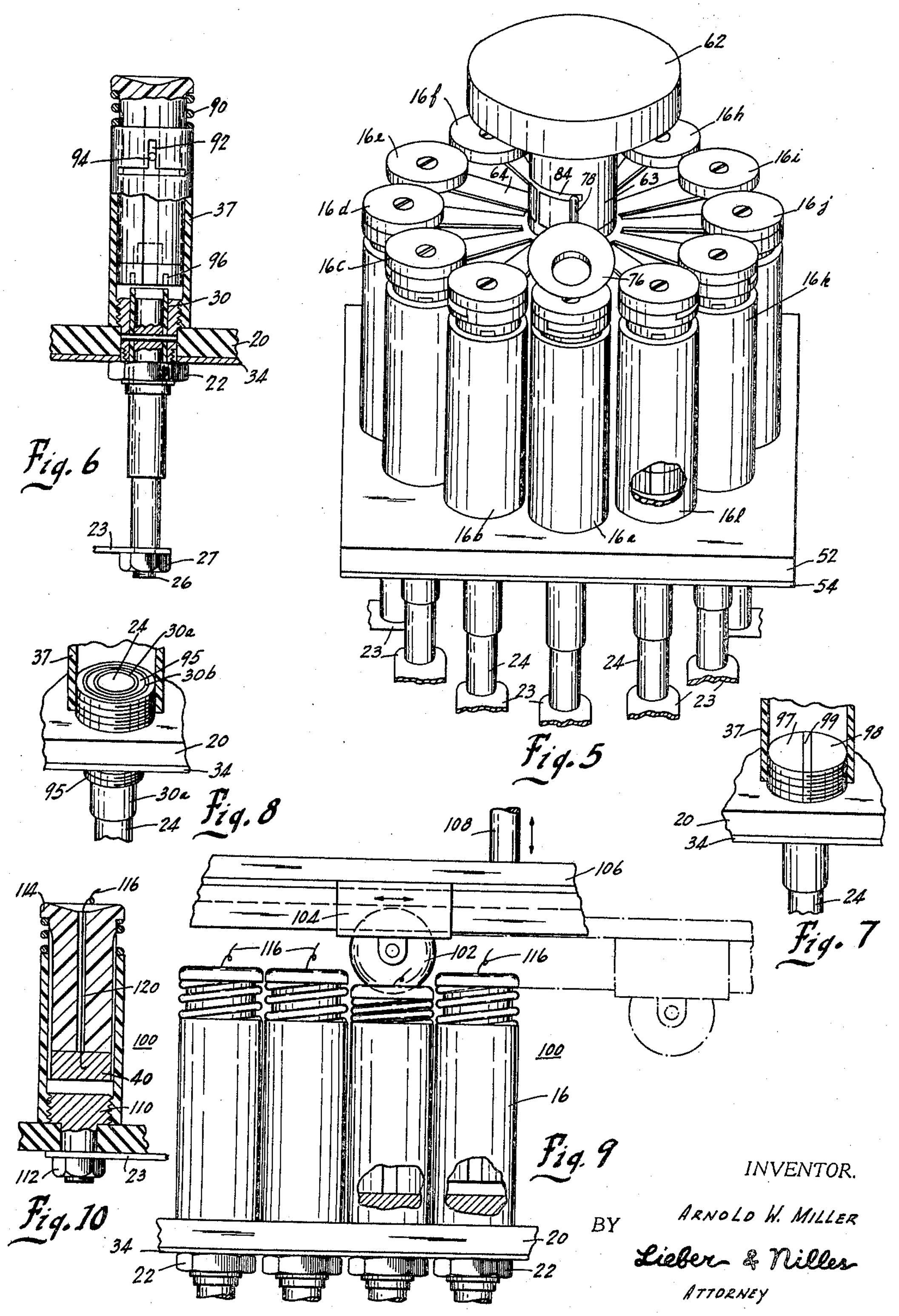
FIGURE 5 is a perspective view of the switching means of FIGURES 2 through 4.
FIGURES 6 and 8 are views of alternative embodiments of the switching element of FIGURE 1.
FIGURE 9 is a view of an alternative embodiment of the switching means of the present invention.
FIGURES 7 and 10 are views of switching elements.

To prevent excessive oxidation of the mercury on discs 40 and central conductors 24 and outer conductors 28, provision is made in switch 50 to close all of switching elements **16*a* through 16*k* when switch 50 is not in use. FIGURE 5 shows switch 50 in such a position. To close all switching elements 16*a* through 16*k*, knob 62 is depressed to slide depending hub 63 downward along shaft 60. This depresses hub 65 of spider 64 so as to lower all of the plungers 38 in tubes 37 so that discs 40 contact central conductors 24 and outer conductors 28**.

It will be appreciated that the depressing knob 62 and hub 63 positions shaft 78 in the top of vertical slot 82 and in line with horizontal slot 84. Knob 62 may then be rotated, as shown in FIGURE 5, so that shaft 78 is positioned in slot 84. This retains knob 62 and hub 63 in the depressed position and locks each of switching elements 16 in the closed position to impede the oxidation process of the mercury.

Numerous modifications and alterations may be made to both switching element and the switch described above. For example, the spring means to retain a switching element in the open position may be incorporated in the individual elements rather than in an external common spring 74. A coil spring, such as spring 90 as shown in FIGURE 6, may be used for this purpose. The means to lock switching element 16 in the closed position may also be located on the individual elements as, for example, T shaped slot 92 in tube 37 containing pin 94 mounted on plunger 38.

Also as shown in FIGURE 6, insulator 30 may extend above surfaces 25 and 29 of central conductor 24 and outer conductor 28 so as to lengthen the insulating path between the conductors. Disc 40 contains a corresponding groove 96.

While the use of pair of conductors co-axially arranged, such as central conductor 24 and outer conductor 28, has been described above, it will be appreciated that other conductor configurations may be used. For example, three conductors, 24, 28 and 95 may be arranged triaxially as shown in FIGURE 8 and separated by insulators **30*a* and 30*b*. The abutment of disc 40 shorts the three conductors together. Conductors arcuately arranged are shown in FIGURE 7 by conductors 97 and 98, separated by insulator 99**.

FIGURE 10 shows an additional embodiment of a switching element. Switching element 100 includes a first member 110, formed of a solid piece of brass or copper, having a terminal which is connected, as by nut 112, to bus 23. The upper surface of first member 110 is coated with mercury. Second member 114 is similar to second member 36 except that a flexible wire 116 extends through hole 120 in the member and is connected to disc 40. Wire 116 forms the second terminal of switching element 100. Tube 37 is affixed to the outer surface of the upper portion of first member 110 to aid the movement of second member 114 toward and away from first member 110 to open and close the electrical connection between the two members.

The configuration of switch 50 may be varied if desired. FIGURE 8 shows a switch in which the switching elements are arranged in a rectilinear pattern rather than in the circular pattern of switch 50. The switching elements which are shown as switching elements 100, but may be switching elements 16, are operable by a roller 102, journalled in trolley 104. Trolley 104 moves along rail 108 over the tops of switching elements 100 to depress the desired one of the plungers 38 and close that switching element. All of the switching elements may be closed by moving trolley 104 to one side and lowering rail 106, by handle 108, or other appropriate means on to the tops of switching elements 16.

It will be appreciated that other modifications and alterations may be made to the invention described above, and it is desired to cover in the concluding claims, all such modifications and alterations as come within the true scope in spirit of the invention.

I claim:

1. A switching element for providing a breakable connection of high repeatability between plurality of terminals, said switching element comprising:

a first member having a plurality of coaxially spaced, mercury wetted surfaces separated by an insulator, each of said surfaces being connected to a terminal; and a second member operatively associated with said first member and movable axially toward and away from said first member, said second member including a mercury wetted shorting surface adapted to connect the spaced surfaces of said first member when said second member is moved toward and into abutment with said first member.

2. The switching element according to claim 1 including a housing, said first member being fixedly located within said housing and said second member being slidably positioned within said housing.

3. The switching elements, according to claim 2, wherein said second member includes air vents to permit said second member to move into abutment with said first member.

4. The switching element, according to claim 1, wherein said second member includes a means operably associated therewith to move said member away from said first member so as to maintain said switching element in the open position.

5. The switching element according to claim 1, wherein said second member includes a means operatively associated therewith to retain said second member in abutment with said first member so as to lessen the oxidation of the mercury on the surfaces.

6. The switching element according to claim 1, wherein said housing contains oil to seal said mercury wetted surfaces.

7. The switching element according to claim 1, wherein said mercury wetted surfaces and said insulator are coplanar.

8. The switching element according to claim 1 wherein said insulator extends above said mercury wetted surfaces to increase the insulating path and said second member contains a groove for receiving the raised insulator.

9. A switch providing breakable connections of high repeatability between a plurality of terminals, said switch comprising:

a plurality of switching elements, each including a first member having a plurality of coaxially spaced, mercury wetted surfaces separated by an insulator, said surfaces being connected to the terminals, and a second member operatively associated with said first member and axially movable toward and away from said first member, said second member including a mercury wetted shorting surface adapted to connect the coaxial surfaces of said first member when said second member is moved toward and into abutment with said first member, and selector means operatively associated with said switching elements to selectively move said second members toward and into abutment with said first members.

10. The switch according to claim 9, further defined in that each of said plurality of switching elements includes a housing, said first members being fixedly located within said housings and said second members being slidably positioned within said housings.

11. The switch according to claim 10, further defined in that said selector means includes means to move and retain all of said second members in abutment with said first members so as to lessen the oxidation of said mercury on said surfaces.

12. The switch according to claim 11, further defined in that said plurality of switching elements are positioned in a circular pattern on a common support, said selector means being located in the center of said circular pattern and indexable in an arcuate path to selectively move said second members toward and into abutment with said first members.

13. The switch according to claim 11, further defined in that said plurality of switching elements are positioned in a rectilinear pattern on a common support, said selector means being indexable in a rectilinear path to selectively move said second members toward and into abutment with said first members.

14. The swtiching element according to claim 2 further defined in that said first and second members are located and positioned in said housing so that said second member is movable toward and away from said first member in a vertical direction.

15. The switch according to claim 9, further defined in that one of said plurality of mercury wetted surfaces of said first member is connected to a terminal common to all of said switching elements, and others of said plurality of mercury wetted surfaces of said first member are connected to others of the plurality of terminals.

16. The switching element according to claim 2, wherein said housing comprises a tube, said first member being located at one end of said tube, said second member being slidable along the axis of said tube, said second member and said tube being closely fitted so as to maintain the mercury wetted surfaces of said first and second members parallel.

References Cited

UNITED STATES PATENTS

| | | | |
|---|---|---|---|
| 517,401 | 3/1894 | Allen | 200—152.9 |
| 787,722 | 4/1905 | Britsch. | |
| 2,288,811 | 7/1942 | Leveridge | 335—58 |
| 3,118,989 | 1/1964 | Gray | 335—196 X |
| 3,155,804 | 11/1964 | Gewirtz. | |

ROBERT K. SCHAEFER, Primary Examiner

R. A. VANDERHYE, Assistant Examiner

U.S. Cl. X.R.

200—16.1, 153, 165, 166; 335—58